US006058001A

United States Patent [19]

McComber, Sr. et al.

[11] Patent Number: 6,058,001

[45] Date of Patent: May 2, 2000

[54] CIRCUIT BREAKER SYSTEM FOR THREE-PHASE, FOUR-WIRE, DELTA-CONNECTED ELECTRIC PANELS

[76] Inventors: Glenn R. McComber, Sr., 7371 Ebro Rd.; Scott E. McComber, 6145 Bixel La., both of Englewood, Fla. 34224

[21] Appl. No.: 09/246,487

[22] Filed: Feb. 9, 1999

[51] Int. Cl.[7] .................................... H02B 1/20

[52] U.S. Cl. .................... 361/115; 361/636; 361/655; 361/656

[58] Field of Search .................... 361/102, 115, 361/634, 636, 652, 655, 656, 673

[56] References Cited

U.S. PATENT DOCUMENTS

| | | | |
|---|---|---|---|
| 4,251,851 | 2/1981 | Diersing et al. | 361/652 |
| 4,929,919 | 5/1990 | Link et al. . | |

*Primary Examiner*—Michael J. Sherry

*Attorney, Agent, or Firm*—Eugene Stephens & Associates

[57] ABSTRACT

A circuit breaker system designed for three-phase, four-wire, delta-connected electric panelboards or loadcenters allows users to derive 120 volts from vacant full size higher voltage leg bus spaces. Two independently operating circuit breakers arranged side by side, in a "side-car" configuration, allows both breakers to electrically connect with a 120 volt bus while positioning one breaker in a vacant full size high leg bus space. The use of an electrically conductive bridge running between the breakers allows the second breaker to be positioned in a vacant high leg pole or full size space while receiving 120 volts from the first breaker. The result provides the user with a breaker in a full size vacant high leg space that can be used to power 120 volt to neutral circuits. This system is capable of providing additional 120 volt circuits in a cost-effective manner without violating the National Electric Code.

15 Claims, 3 Drawing Sheets

CIRCUIT BREAKER SYSTEM FOR THREE-PHASE, FOUR-WIRE, DELTA-CONNECTED ELECTRIC PANELS

TECHNICAL FIELD

A circuit breaker system that allows users to derive 120 volts from higher voltage leg spaces of a delta-connected, three-phase, four-wire electric panel.

BACKGROUND

Delta-connected, three-phase, four-wire electric panelboards or loadcenters have two 120 nominal volt buses and one 180 volt to 208 volt bus that is commonly referred to as the higher voltage leg or "high leg". (Hereinafter, this bus will be referred to as either the high leg or 208 volt bus, and the lower voltage buses will be referred to as 120 volt buses, even though voltage fluctuates and is not always exactly 120 volts.) Each bus of the distribution panel typically has one-third of the available spaces.

A common problem with this design is that users often fill all of the available 120 volt spaces leaving vacant only the high leg bus spaces. High leg spaces are useful for three-phase motors and other three-phase power equipment, but they cannot be used to power 120 volt equipment. A user who attempts to connect 120 volt equipment to the high leg power supply is likely to burn out the equipment.

A user also cannot double up 120 volt breakers in single breaker pole spaces to provide additional 120 volt to neutral circuits beyond the allotted capacity of a panelboard or loadcenter that derives its power from a delta-connected, four-wire, three-phase power system. Article 384-15 of the National Electric Code prohibits this, and manufacturers design panels or loadcenters not to accept any such excess 120 volt breakers. The consequence of this is that potentially one-third of the available poles or spaces of a delta-connected panelboard or loadcenter are unsuitable for 120 volt to neutral circuits (see FIG. 1). The present solutions are to have any desired additional 120 volt circuits fed from another location or to install a trans former and sub-panel. Unfortunately, these measures are quite costly.

In the end, consumers are disappointed that they are left with vacant spaces in the panel that cannot be used. Electricians are equally frustrated by being unable to offer consumers a cost-effective solution to this problem.

SUMMARY OF THE INVENTION

We recognize the importance of a circuit breaker system that allows consumers to use available high leg spaces to power ordinary 120 volt equipment without violating Article 384-15 of the National Electric Code. To satisfy this need, we have developed a breaker system that uses two full adjacent poles or spaces on a panel. Our breaker system uses one vacant full size high leg space and one 120 volt space while performing as a single pole twin or tandem breaker.

We accomplish this by electrically connecting a first circuit breaker to a 120 volt bus with an associated second circuit breaker positioned adjacent to the first breaker. The second circuit breaker is positioned in a space for the high leg bus without being electrically connected to the high leg bus. The over-current protection mechanism of the second breaker, located in a space committed to the high leg, receives power internally from the adjacent, electrically connected 120 volt bus powered breaker. This "side-car" arrangement lets users fill available high leg spaces on the panel and use those spaces to power ordinary 120 volt circuits without violating Article 384-15 of the National Electric Code. This enables a user to derive 120 volts from any and all available spaces of a delta-connected, four-wire, three-phase power system electric panel (see FIG. 2). The resulting breaker system operates just as any standard twin or tandem breaker, having two independently operating over-current protection mechanisms.

An alternative embodiment of this system allows the installation of an optional breaker with a power bridge coupling system to accept the addition of an optional side-car breaker. This embodiment provides the user the option of attaching or mating a side-car breaker to a 120 volt bus powered breaker, by positioning the side-car breaker over an adjacent high leg pole or space.

DRAWINGS

Figure 4:
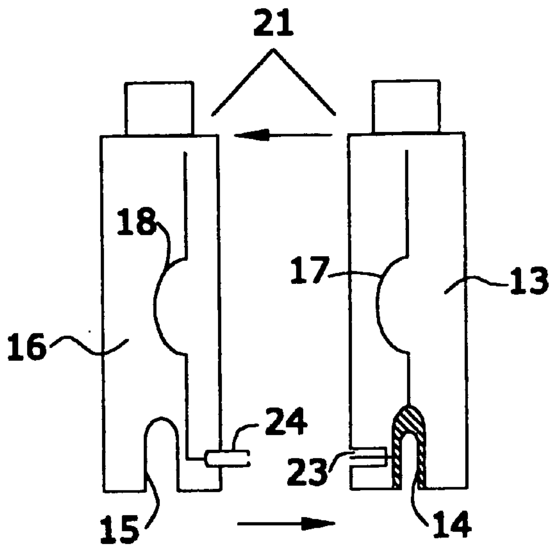

FIG. 4 schematically depicts the alternative embodiment of the side-car breaker, wherein a side-car breaker can be joined or removed from a 120 volt bus powered breaker.

DETAILED DESCRIPTION

Figure 1:
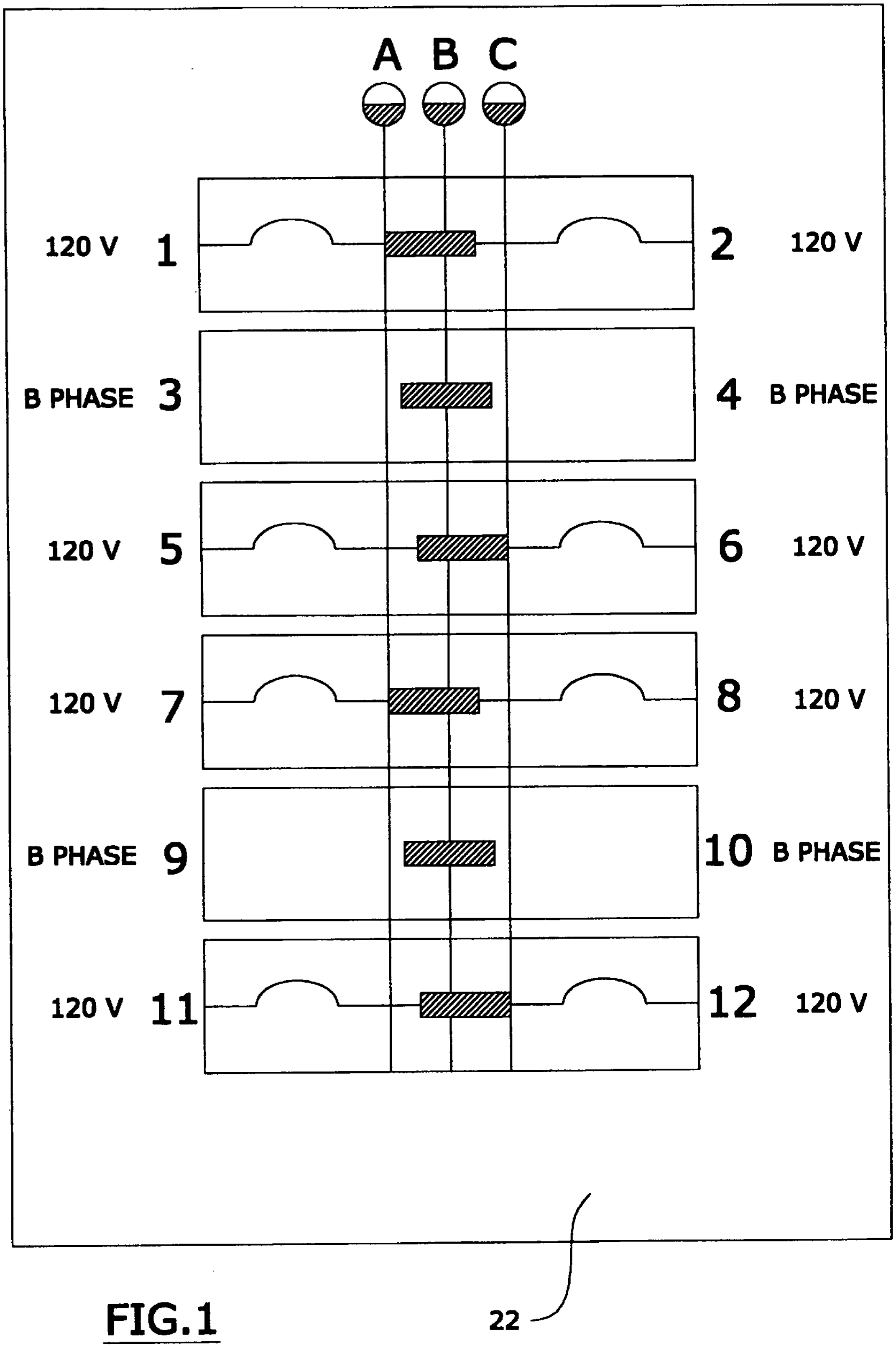
FIG.1 PRIOR ART
FIG. 1 is a schematic view depicting a three-phase, four-wire, delta-connected electric panel equipped with standard circuit breakers, wherein only two-thirds of the spaces are available for 120 volt to neutral circuits.

FIG. 1 illustrates a typical delta-connected, four-wire, three-phase system with a high voltage phase bus B and two 120 volt buses A and C. As shown, only two-thirds of the panel is available for 120 volt circuits because the B phase bus, which is allotted one-third of the circuit spaces, has a higher voltage output.

Therefore, spaces 1,2,5,6,7,8,11, and 12 are used for 120 volt to neutral circuits while spaces 3,4,9, and 10 have no breakers and are reserved for B phase or 180 to 208 volt power.

A problem frequently encountered with three-phase, delta-connected, four-wire electric panelboards or loadcenters is the need for more 120 volt to neutral circuits. As explained, three-phase delta-connected panels commonly have two 120 volt buses A and C and one central 208 volt or "high leg" bus B in accordance with Article 384-3f of the National Electric Code. Because users often have a greater need for 120 volt power, they tend to fill all the available 120 volt spaces A, C. This leaves the user with only vacant high leg B spaces (3, 4, 9 and 10 as shown in FIG. 3) that are unsuitable for powering 120 volt equipment.

We recognize the frustration that users experience when they learn that the vacant spaces on the high leg bus cannot be used to power 120 volt equipment. Until now, electricians have only been able to offer users costly solutions to this problem. Moreover, unless a panel is equipped with notched bus stabs, Article 384-15 of the National Electric Code prohibits the doubling up of 120 volt breakers in single breaker spaces. Our circuit breaker system 21 solves this problem in a cost-effective manner that complies with the National Electric Code.

Figure 3:
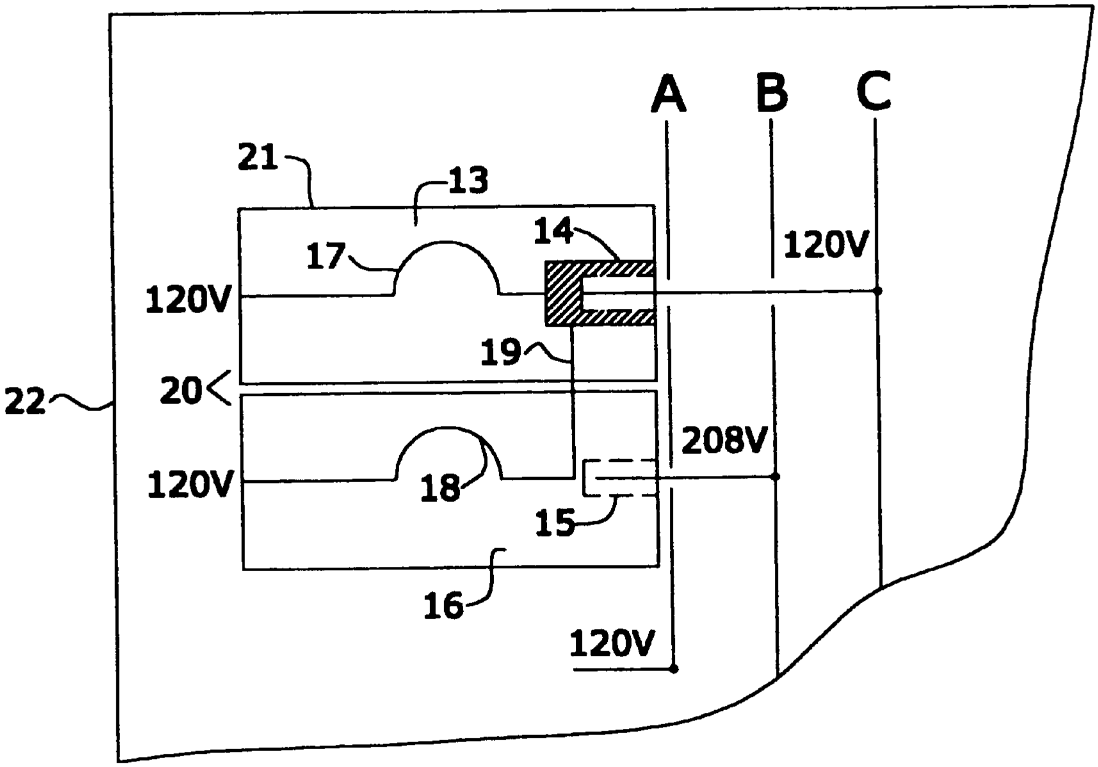
FIG. 3 is a schematic fragmentary view depicting the single housing embodiment of the circuit breaker system as it would appear when connected to a three-phase, four-wire, delta-connected electric panel.

Our breaker system 21, as shown in FIG. 3, makes it possible for a circuit breaker 16 to be physically positioned within a vacant, adjacent pole or full size space of a high leg bus B while being able to supply 120 volts. This system 21 consists of two independently operating circuit breakers 13 and 16 with separate internal overcurrent mechanisms 17 and 18, prearranged side by side in a sidecar like fashion.

The side-car configuration allows one breaker 13 to connect to a 120 volt bus A or C of a three-phase, four-wire, delta-connected panel 22 while the second breaker 16 fills an adjacent full size vacant space over the high leg B of the panel 22. The breakers can be manufactured within a single housing 20 (see FIG. 3); or they can be manufactured individually so that they can be mated using a power bridge pin receiver 24 and a power bridge pin 23, allowing for optional attachment or removal, as shown in FIG. 4.

If manufactured within a single housing 20, the breaker 13 positioned on the 120 volt bus A or C is equipped with a mechanical and electrically conducting means of attachment 14. The second or side-car breaker 16 can be positioned in an adjacent high leg B space in one of two ways. First, the breaker 16 can be equipped with a mechanical means of attachment 15, similar to that of the first breaker 13, except electrically insulated. Breaker 16 can also be positioned within an available high leg B space without the use of a mechanical connector 15. In the absence of the mechanical connector 15, breaker 16 would simply be suspended over the high leg B space while being supported by the housing 20. In either case, the user can position a breaker 16 over an available high leg B pole or space without having to receive high leg voltage from the bus B.

An alternative embodiment, depicted in FIG. 4, has the side-car breaker 16 optionally mating with the 120 volt bus powered breaker 13. Again, breaker 16 is made to be positioned within a high leg B space while remaining electrically insulated from the high leg bus B. The mating of the two breakers is accomplished by using a power bridge pin receiver 24 and a power bridge pin 23. This embodiment allows the use of a 120 volt bus connected breaker 13 to which a user can attach a side-car breaker 16 as needed. The advantage of this embodiment over the single housing embodiment shown in FIG. 3 is that the user has the option of filling an adjacent high leg B space with either a mateable side-car breaker 16 or a standard breaker (not shown) for use with high power equipment. When the need arises to use an adjacent, vacant high leg B space to supply a 120 volt circuit, a side-car breaker 16 can be attached to the 120 volt bus connected breaker 13 so that it is positioned in an adjacent vacant pole or full size space over the high leg bus B without receiving power from it.

In both of the embodiments of FIGS. 3 and 4, there must be an electrically conducting bridge 19 positioned between the two breakers. The bridge 19 runs from the 120 volt breaker 13 to the side-car breaker 16 so that the breaker 16 is supplied with 120 volts. This way, the user fills the available high leg B breaker spaces and enables them to power 120 volt to neutral circuits.

Figure 2:
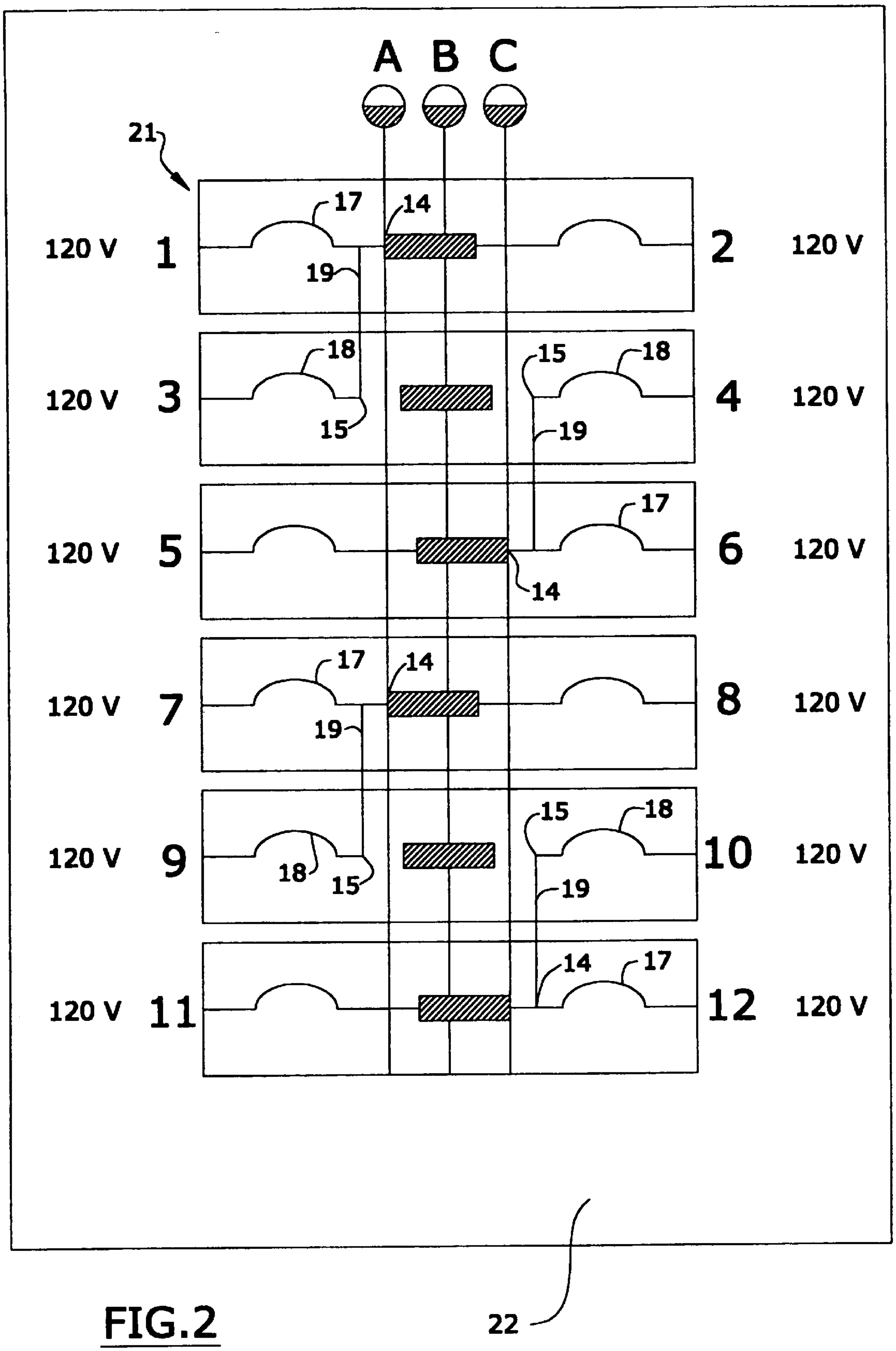
FIG. 2 is a schematic view of a three-phase, four-wire, delta-connected electric panel equipped with "side-car" circuit breakers so that the entire panel can be used for 120 volt circuits.

FIG. 2 illustrates the voltage output when B phase spaces 3,4,9 and 10 are filled using our side-car breaker system 21. The entire panel 22 can now be used for 120 volt circuits.

The resulting breaker system 21 allows users to fill vacant high leg B spaces on a three-phase, delta-connected electric panel 22 with breakers that can be used to power 120 volt equipment. Furthermore, this system 21 allows the user to accomplish this cost-effectively while maintaining compliance with the National Electric Code.

We claim:

1. A circuit breaker system supplying additional 120 volt circuits from a three-phase, four-wire, delta-connected electric panel comprising:

a. a first circuit breaker with a mechanical and electrical connector connecting the first breaker to a 120 volt bus of the panel;

b. an independently operating second circuit breaker joined to the first circuit breaker so that the second circuit breaker is positioned to occupy an adjacent, vacant high leg space; and c. an electrically conductive bridge running from the first circuit breaker to the second so that the second breaker receives 120 volts and can be used to power ordinary 120 volt circuits.

2. The circuit breaker system of claim 1, wherein the independently operating second circuit breaker is attachable and removable from the first circuit breaker so that a user may attach and remove the second breaker as desired.

3. A circuit breaker system providing additional 120 volt circuits in a delta-connected, three-phase, four-wire electric panel comprising:

a. two independently operating circuit breakers joined side by side;

b. a mechanical, electrically conducting connector that connects a first circuit breaker to a 120 volt bus of the panel;

c. an electrically conductive bridge running between the first and a second circuit breaker transmitting 120 volts from the first circuit breaker to the second; and d. the second circuit breaker occupying an adjacent high leg space without being electrically connected to the high leg bus.

4. The circuit breaker system of claim 3, wherein the two independently operating circuit breakers are side by side, contained within a single housing.

5. The circuit breaker system of claim 3, wherein an electrically insulated mechanical connector connects the second circuit breaker to the high leg bus.

6. A circuit breaker system comprising:

a. two circuit breakers joined side by side, each having an independently operating over-current mechanism;

b. a first circuit breaker with a connector allowing the breaker to be electrically connected to a 120 volt bus; and c. a conductive bridge running between the two breakers from the first circuit breaker to a second circuit breaker occupying an adjacent high leg space.

7. The circuit breaker system of claim 6, wherein the second circuit breaker is joined to the first and electrically insulated from the high leg bus.

8. The circuit breaker system of claim 6, wherein the two breakers are joined to form a single unit double breaker that can be used with a three-phase, four-wire, delta-connected electric panel to supply an additional 120 volt circuit.

9. The circuit breaker system of claim 6, wherein the two circuit breakers are joined so that they are removable from each other to give a user the option of adding or removing the second circuit breaker.

10. A circuit breaker system combining two circuit breakers comprising:

a. a first circuit breaker joined side by side with a second independently operating circuit breaker, each occupying a full space;

b. a 120 volt supply to the first circuit breaker from a 120 volt bus of a three-phase, four-wire, delta-connected electric panel; and c. the 120 volt supply to the first breaker branching to the second circuit breaker occupying an adjacent high leg space through a conductive bridge running from the first breaker to the second.

11. The circuit breaker system of claim 10, wherein the second circuit breaker is joined with the first breaker but is not electrically connected to a high leg bus.

12. The circuit breaker system of claim 10, wherein the second circuit breaker is joined with the first and is positioned so that it occupies an adjacent space over the high leg bus of the three-phase, four-wire, delta-connected panel while remaining electrically insulated from the high leg bus.

13. A method of occupying vacant spaces of a high leg bus of a three-phase, four-wire, delta-connected electric panel with a circuit breaker that can be used for 120 volt circuits comprising:

a. pre-arranging two independently operating circuit breakers side by side, occupying adjacent full spaces, wherein one of the occupied spaces is a high leg space;

b. connecting a first circuit breaker to a 120 volt bus of a three-phase electric panel using an electrically conductive connector; and c. creating a conductive bridge to run from the first circuit breaker to a second circuit breaker located over the high leg bus.

14. The method of claim 13, including arranging the two independently operating breakers by positioning them side by side in a manufactured single housing.

15. The method of claim 13, including attaching the second circuit breaker to the high leg bus of the panel by using an electrically insulated connector so that the second circuit breaker is positioned on an available space of the high leg bus without receiving power from it.

* * * * *